US005640885A

United States Patent [19]

Spence

[11] Patent Number: 5,640,885

[45] Date of Patent: Jun. 24, 1997

[54] NAILER EXTENSION DEVICE

[76] Inventor: Randy Spence, R.D. 1 Box 295-H, Hartly, Del. 19953

[21] Appl. No.: 404,061

[22] Filed: Mar. 14, 1995

[51] Int. Cl.$^6$ .......... F16C 1/10

[52] U.S. Cl. .......... 74/501.6; 74/500.5; 74/491; 74/501.5 R; 74/557; 16/110 R

[58] Field of Search .......... 74/501.5 R, 500.5–502.4, 74/502.6, 502, 557, 526, 527, 528, 530; 30/85, 272.1, 88, 89; 16/110 R; 81/489

[56] References Cited

U.S. PATENT DOCUMENTS

| | | | |
|---|---|---|---|
| D. 250,569 | 12/1978 | Smith . | |
| 3,949,817 | 4/1976 | Rice . | |
| 4,164,813 | 8/1979 | Dittert et al. | 30/272 A |
| 4,207,675 | 6/1980 | Causey et al. . | |
| 4,359,822 | 11/1982 | Kolodziejczyk . | |
| 4,392,538 | 7/1983 | Goertzen | 16/11 A X |
| 4,406,066 | 9/1983 | Itzrodt | 30/382 |
| 4,707,921 | 11/1987 | Meyer et al. . | |
| 4,802,378 | 2/1989 | Memmola | 74/500.5 X |
| 5,076,411 | 12/1991 | Kramer et al. | 30/381 X |
| 5,129,363 | 7/1992 | Ricketts . | |
| 5,167,166 | 12/1992 | Ruhlman | 74/530 |
| 5,176,160 | 1/1993 | Osborn . | |
| 5,228,202 | 7/1993 | Liao . | |
| 5,339,916 | 8/1994 | Louis | 74/527 |

FOREIGN PATENT DOCUMENTS

| | | | |
|---|---|---|---|
| 0554133 | 8/1993 | European Pat. Off. | 74/502.4 |

*Primary Examiner*—Vinh T. Luong
*Attorney, Agent, or Firm*—Richard C. Litman

[57] ABSTRACT

The nailer extension device has a handle, a trigger system near the handle to actuate the nailer, and a cable system running inside the cylindrical part of the device. The cable system connects the trigger of the extension handle with the trigger of the nailer. An adjustable knuckle allows the user to set the angle of the nailer in reference to the extension handle. The adjustable knuckle allows the user to nail objects at different heights while keeping the nailer on a horizontal plane.

10 Claims, 4 Drawing Sheets

NAILER EXTENSION DEVICE

BACKGROUND OF THE INVENTION

1. Field of the Invention

The present invention relates to a nailer extension device. More specifically, the present invention relates to an extension handle that will greatly extend the effective reach of a nailer gun or similar tool.

2. Description of the Prior Art

As often is the case, carpenters and other workers must us tools in awkward or seemingly impossible positions. One of these difficult positions encountered by carpenters is having to hammer nails at great heights or hard to reach corners. Not only must the carpenter use hammers and nails at hard to reach heights but sometimes must also change the angle at which the nail is hammered. These problems are not solved merely through the use of a ladder but require additional tools. There is therefore a need for a device that will extend the effective reach of a workman's tool such as a nailer. Such a device must allow the user to quickly and easily change the angle of the tool without lowering the tool and must have structure to support the device in order to reduce the amount of strain put on the user. The present invention provides such a device.

Work tool extension devices have been described in the patent literature. For instance, U.S. Pat. No. 3,949,817, issued Apr. 13, 1976, to Rice, describes an extender for a chain saw. The Rice patent, however, fails to show or suggest a pivotable extender or support means for the extender.

U.S. Pat. No. 4,207,675, issued Jun. 17, 1980, to Causey et al., and U.S. Pat. No. 4,359,822, issued Nov. 23, 1982, to Kolodziejczyk describe a pivotable tool extender. Both the Causey et al. and the Kolodziejczyk patents, however, fail to show or suggest a pivotable tool extender that is easily pivotable without having to first lower the extender and then re-bolt or re-tighten the pivot means.

U.S. Pat. No. 5,228,202, issued Jul. 20, 1993, to Liao and U.S. Pat. No. 4,707,921, issued Nov. 24, 1987, to Meyer et al., describe extension handles.

U.S. Pat. No. 5,129,363, issued Jul. 14, 1992, to Ricketts describes a leash apparatus wherein the strap is disposed inside the device.

U.S. Pat. No. 5,176,160, issued Jan. 5, 1993, to Osborn describes a reaching apparatus with a trigger system.

U.S. Design Pat. No. Des. 250,569, issued Dec. 19, 1978, to Smith describes a handle support.

None of the above inventions and patents, taken either singly or in combination, is seen to describe the instant invention as claimed.

SUMMARY OF THE INVENTION

The present invention relates to an extension device for a nailer or similar tool. The device extends the effective reach of a work tool used by a carpenter or other worker by making it easier to work in hard to reach areas.

The extender uses a handle and trigger system to hold and actuate the tool. The work tool is clamped to one end while the user holds the device at the opposite end. The work tool is activated through a trigger system. The trigger system comprises a cable and sheath design similar to those found in bicycle braking systems. When the user pulls the trigger, the trigger system activates to depress the trigger of the work tool.

The extender has a wheeled support that not only will support the device with a work tool attached but also will enable the user to roll the device either along the floor or up a wall. This will greatly reduce the amount of strain placed on the user.

The angle of the nailer can be changed without the necessity of lowering the device and then changing the angle. This invention provides means that will greatly increase the speed and ease by which the angle may be changed. The user simply pulls a lever which allows the device to freely pivot. When the desired angle is reached the user simply lets go of the lever. The user does not have to physically touch the tool to change the angle; he can use either gravity or can press the device against a beam or the side of a wall.

Accordingly, it is a principal object of the invention to provide a nailer extension device that will increase the effective reach of a nailer or other work tool.

It is another object of the invention to provide a nailer extension device with angle adjustment means.

It is a further object of the invention to provide an extension device having a wheeled support.

Still another object of the invention is to provide an extension device using a cable and sheath design.

An additional object of the invention is to provide clamping means to secure the work tool.

It is again an object of the invention to provide a trigger system wherein the trigger of the work tool, located at one end of the device, is activated by a trigger located at the other end of the device.

Yet another object of the invention is to provide a nailer extension device wherein the cables run inside part of the device.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
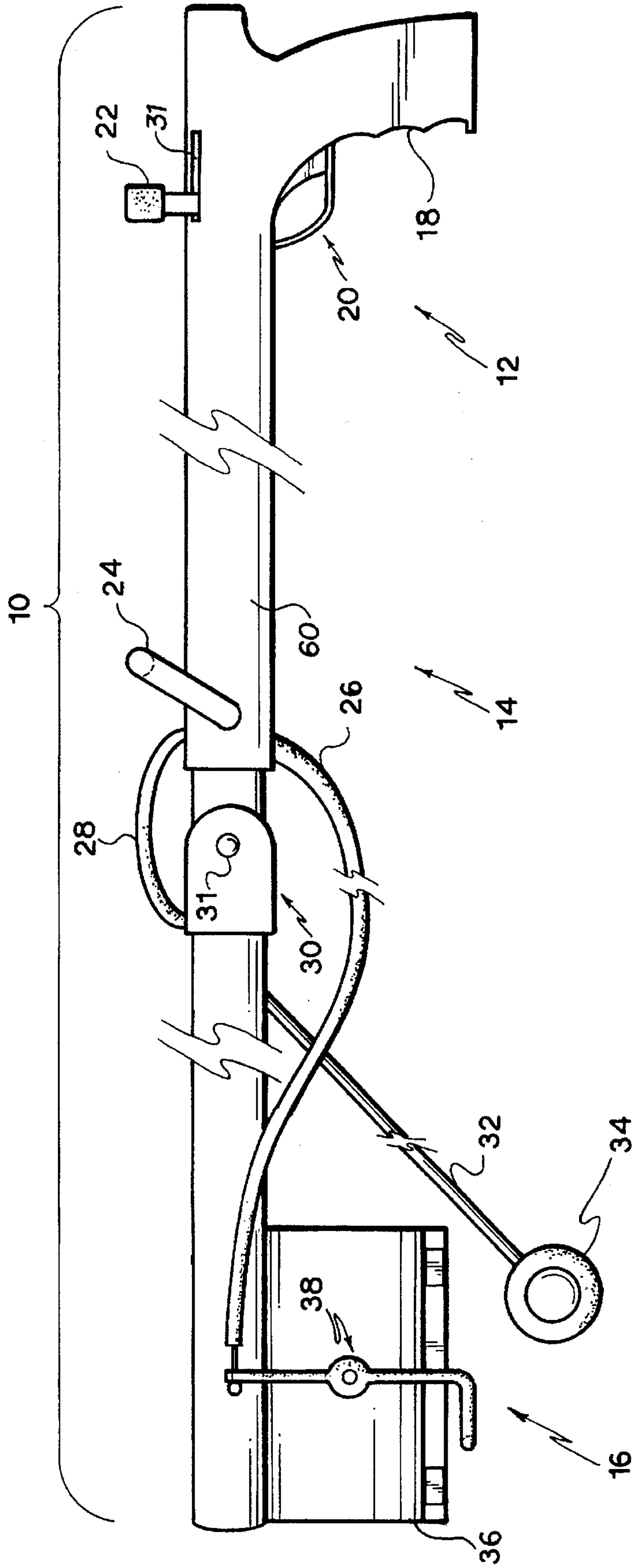
FIG. 1 is a side view of the nailer extension device.

Turning now to FIG. 1 of the drawings, the nailer extension device 10 is shown with a rear section 12, a midsection 14 and a front section 16. The device 10 has a pistol grip handle 18 and a stirrup handle 24 for gripping and holding the device. Trigger 20 in a slot 21 in combination with a first Bowden cable 26 and pivot arm 38 provide means wherein the nailer 56, (see FIG. 4) is activated. Pivot means 30 connected to second Bowden cable 28 provides means to rotate the front section 16 about pivot point 31 when the lever 22 is pulled. The device 10 has clamp 36 to hold the nailer 56 and a support leg 32 and wheels 34 to reduce the strain on the user.

Figure 2:
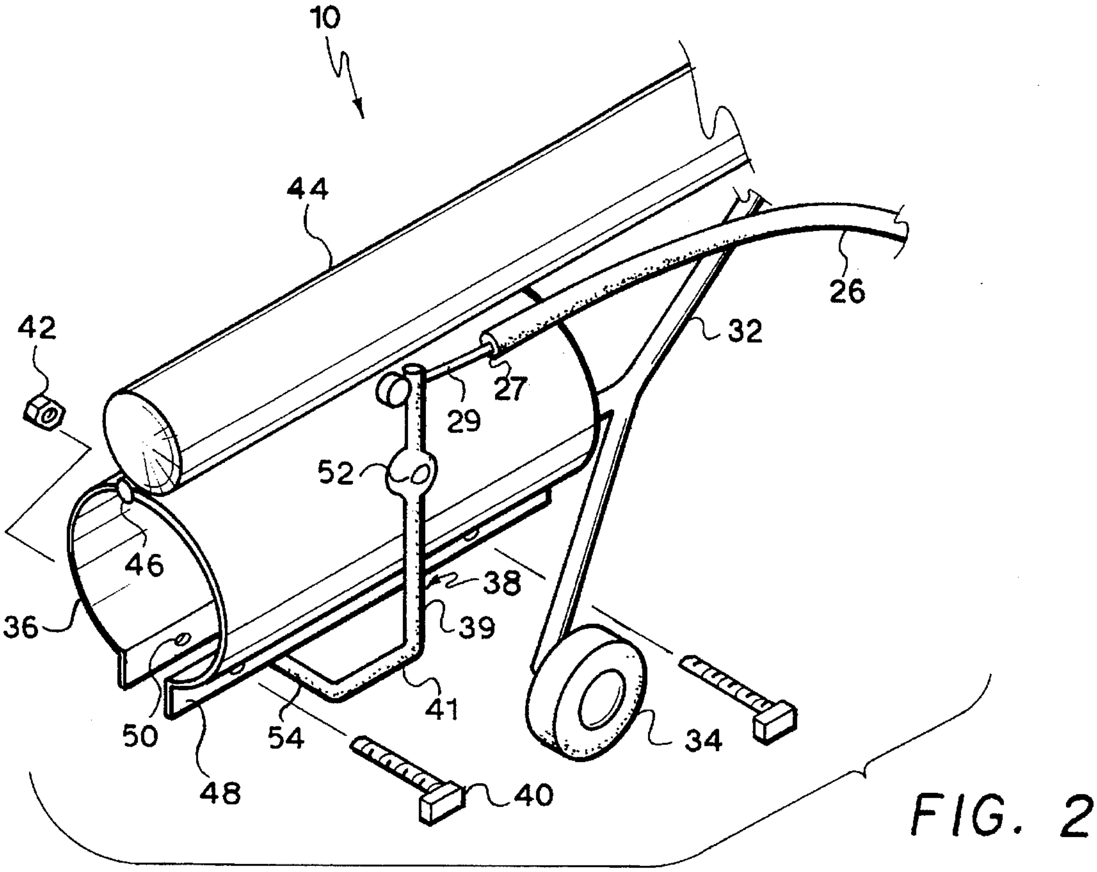
FIG. 2 is a partly exploded, perspective view of the front section of the extension device.
Figure 3:
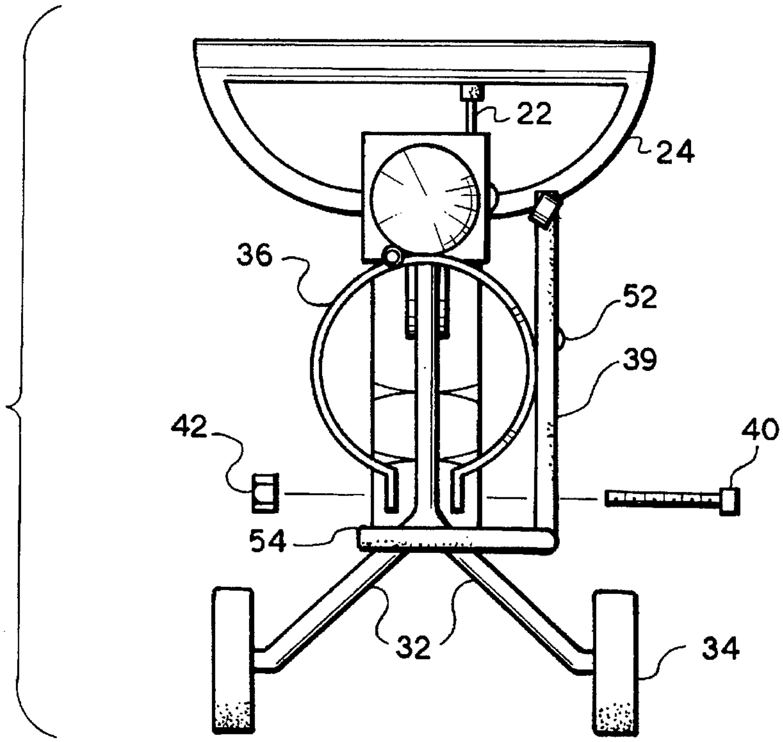
FIG. 3 is a partly exploded, front view of the front section of the extension device.
Figure 4:
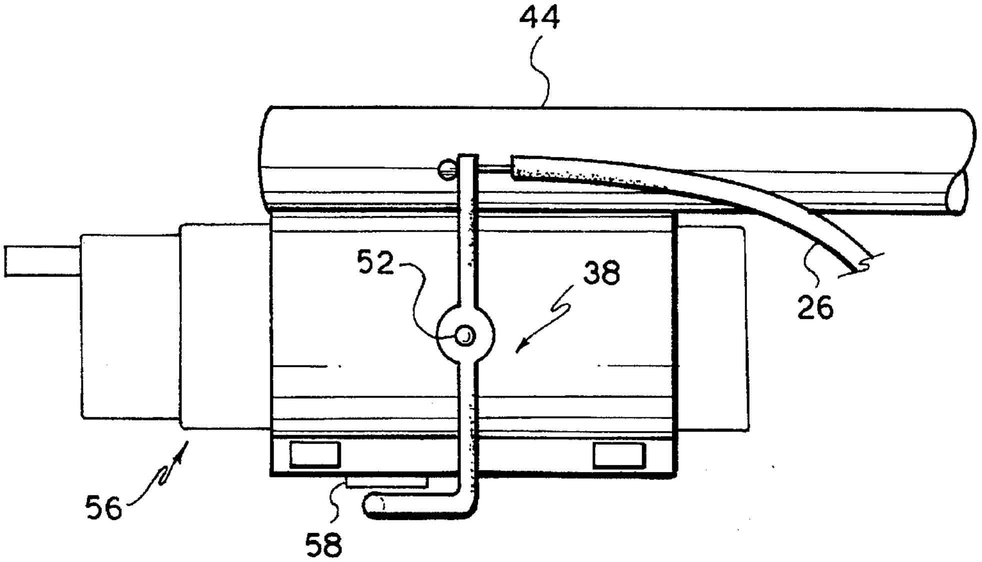
FIG. 4 is a partial side view of the front section of the extension device.

Turning now to FIGS. 2, 3 and 4 of the drawings, the front section 16 of the nailer extension device 10 is depicted. The rod 44 is connected to clamp pivot 46 and clamp 36. The clamp 36 have two flanges 48 that receive fasteners 40 through holes 50. The fasteners 40 are secured with nuts 42.

The first Bowden cable 26 is comprised of a sheath 27 and a wire 29. The wire 29 is connected to a pivot arm 38. The pivot arm 38 pivots about a pivot point 52. Pivot arm 38 consists of three main sections. A first section 39 is generally vertical, a second section 41 is generally horizontal, adjacent to flanges 48 and parallel with rod 44 and a third section 54 is generally horizontal and perpendicular with rod 44.

Figure 7:
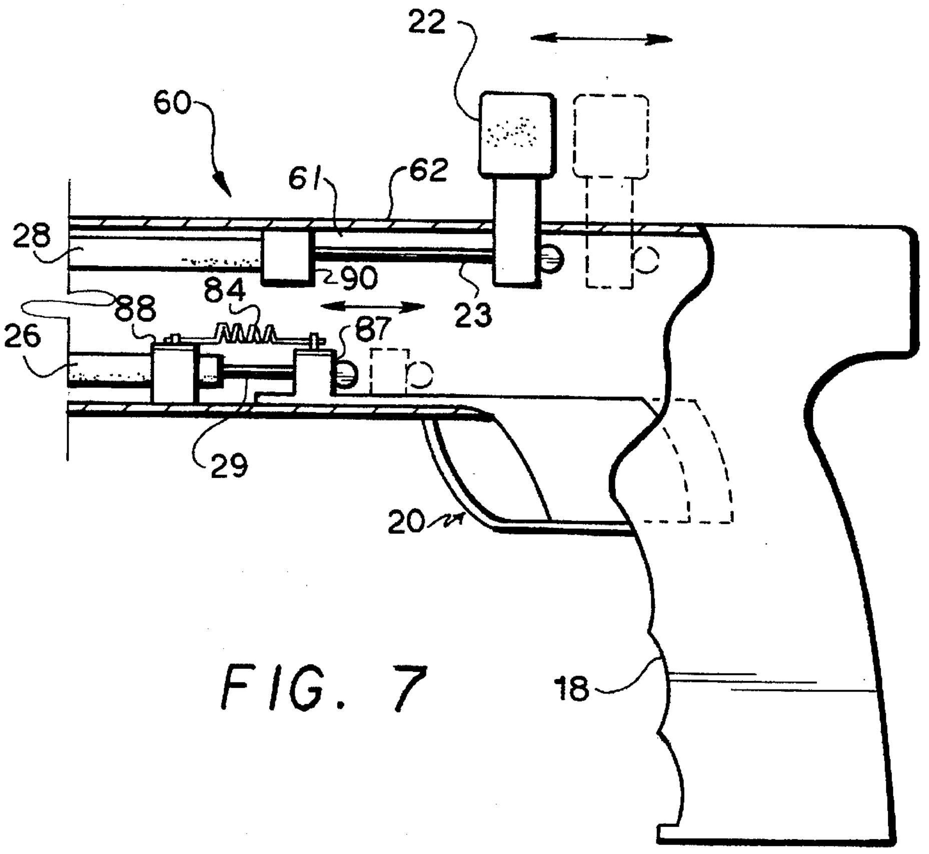
FIG. 7 is a partial cutaway of a side view of the rear section of the extension device.

Now looking at FIGS. 4 and 7, when the trigger 20 is actuated, the first end of the wire 29 is pulled inside sheath 27 of the first Bowden cable 26 towards the rear section 12 (see FIG. 1). This movement causes the second end of wire 29 to rotate the pivot arm 38 clockwise about pivot point 52. The clockwise rotation forces the third section 54 upwards and against the nailer trigger 58 which actuates the nailer 56. Each activation of trigger 20 actuates the nailer 56. When the trigger 20 is released, spring 84 pulls the second securing means 87 back towards the first securing means 88. This action also forces the pivot arm 38 back to its original position.

Figure 5:
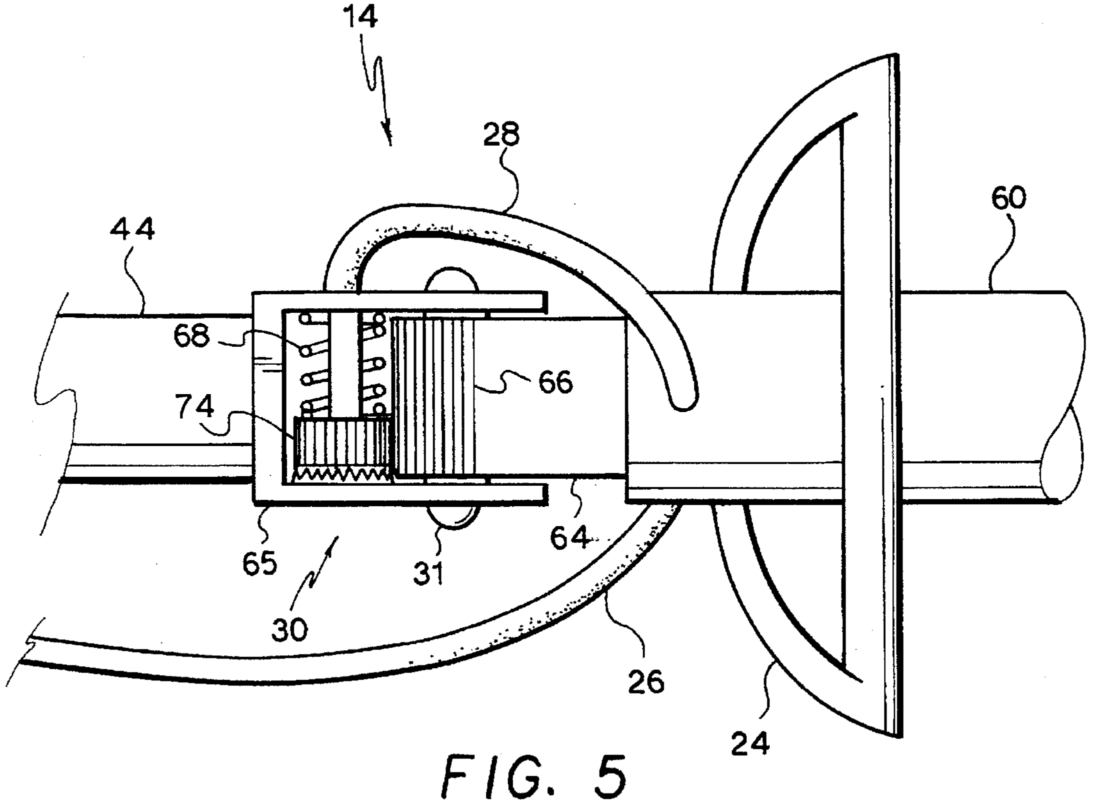
FIG. 5 is a partial top plan view of the midsection of the extension device.
Figure 6:
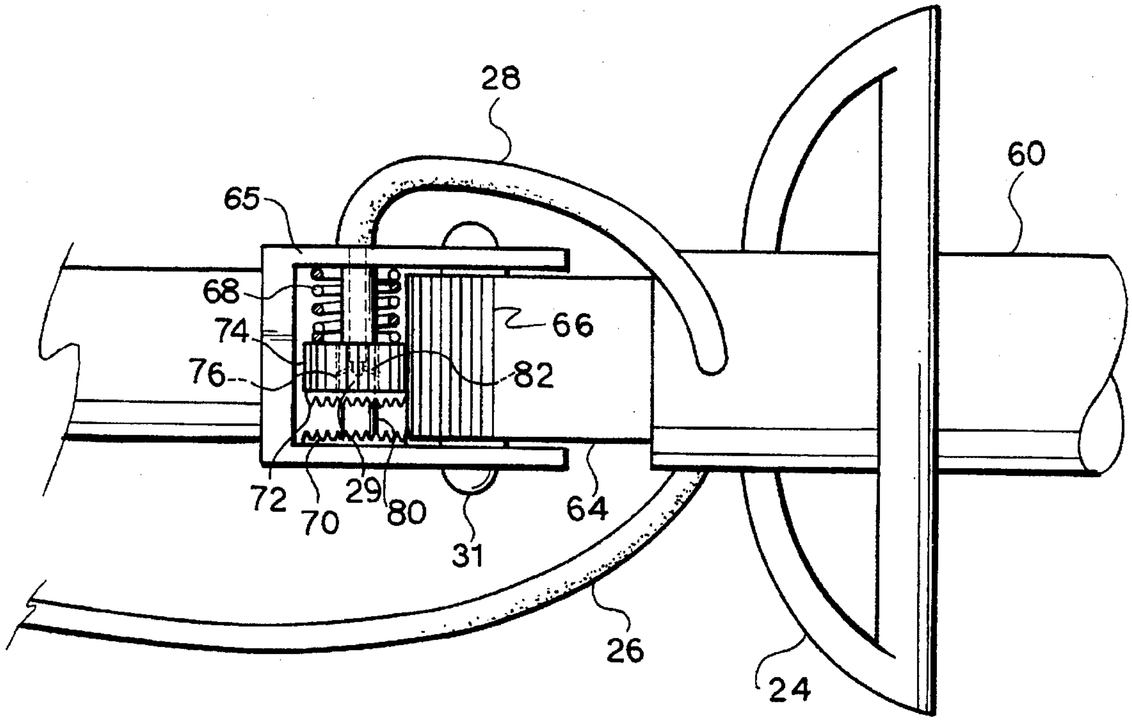
FIG. 6 is a partial view similar to FIG. 5, but showing the operative parts disengaged.

Turning now to FIGS. 5, 6 and 7 of the drawings, the rotating mechanism 30 is depicted. The bracket 65 is connected to rod 44 and rotates about pivot point 31. Pivot point 31 is connected to block 64. Block 64 has second mesh gears 66 dimensioned to fit into first mesh gears 74. First securing means 70 and second securing 72 are designed and configured to prevent first mesh gear 74 from rotating when securing means 70 and 72 are in attached relationship. The securing means 70 and 72 can be of any type or form sufficient to prevent first mesh gear 74 from rotating. A spring 68 is disposed between first mesh gear 74 and bracket 65.

One end of the second Bowden cable 28 is connected to the bracket 65 while the other end is connected to the lever 22. The second cable 28 is connected to the shaft 60 by securing means 90 (as seen in FIG. 7). Second cable 28 runs inside shaft 60 having an interior wall 61 and an exterior wall 62. Wire 23 is connected to lever 22.

Tuning now to FIG. 6 of the drawings, the first mesh gear 74 fits around post 80. Post 80 is hollow and receives wire 23 (FIG. 7). Post 80 has a slit 76 through which connection means 82 connect wire 23 to first mesh gear 74. Looking now at FIGS. 6 and 7 of the drawings, when lever 22 is pulled, wire 23 of the second Bowden cable 28 pulls the first mesh gear 74 out of engagement with the first securing means 70 which allows for the rotation of first mesh gear 74, which in turn allows for the rotation of first section 16 (FIG. 1). When the lever 22 is released, spring 68 forces first mesh gear 74 back in locked relationship with the first securing means 70. This prevents first mesh gear 74 from rotating which in turn locks the first section 16 (FIG. 1) into the position selected by the user. The angle of the front section 16 is changed by first pulling the lever 22, then changing the angle of the front section 16 either by gravity force or by leaning the device against a wall to change the angle, then releasing the lever 22 to lock the front section 16 into place.

It is to be understood that the present invention is not limited to the sole embodiment described above, but encompasses any and all embodiments within the scope of the following claims.

I claim:

1. A combination nailer and nailer extension device with a changeable nailing angle, comprising:

a front section comprising a rod supporting a clamping means for holding a nailer device having a first trigger, said clamping means being closable to contain said nailer device and having a pivot arm pivotable at a pivot point on a side of said clamping means, said pivot arm configured to releasably press against said first trigger;

a midsection comprising a bracket means attached at one end to said rod and including a hollow post having a slit and supporting a spring and an unfixed first mesh gear means having a first securing means on its bottom surface which prevents rotation when urged to engage a second securing means based on a bracket wall by said spring, said first mesh gear means configured on its side surface to continually engage a second mesh gear means fixed on an end of a block having a pivot means for said bracket;

a rear section comprising a hollow shaft attached to said block and ending in a pistol grip handle with a second trigger adjacent to said pistol grip handle, and a lever located in a slot on an upper surface of said shaft and opposite said second trigger;

a first cable connected to the second trigger of said nailer device at one end and to the pivot arm at the opposite end, wherein an operator can actuate the nailer device; and a second cable connected to said lever at one end and to the first mesh gear means by passing through the hollow post and slit;

whereby an operator can rotate the front section relative to the rear section by pulling back on the lever and the second cable to unlock the first mesh gear means to permit the front section to angle downward due to gravity to a desired angle, and lock the first mesh gear means by releasing the lever.

2. The combination nailer and extension device according to claim 1, wherein said first and second cables are sheathed.

3. The combination nailer and extension device according to claim 1, wherein said first and second sheathed cables are Bowden cables.

4. The combination nailer and extension device according to claim 1, wherein a stirrup handle is positioned on an upper surface of said shaft proximate to said block, whereby an operator can hold the device with both hands.

5. The combination nailer and extension device according to claim 1, said extension device further comprising means to support said extension device in an upright position.

6. The combination nailer and extension device according to claim 5, said means to support said extension device comprising:

at least one wheel;

at least one support leg, said at least one wheel connected to said at least one support leg.

7. The combination nailer and extension device according to claim 6, wherein said support means consist of two wheeled support legs.

8. The combination nailer and extension device according to claim 1, said shaft having an interior and an exterior wall, said cable disposed inside said shaft.

9. The combination nailer and extension device according to claim 8, said trigger system further comprising a first means for securing said first end of said cable to said interior wall and a second means for securing said wire to said trigger.

10. The combination nailer and extension device according to claim 9, with said spring connected to said first and second securing means.

* * * * *